US009798971B2

United States Patent
Han et al.

(10) Patent No.: US 9,798,971 B2
(45) Date of Patent: Oct. 24, 2017

(54) VISUAL CORTICAL CIRCUIT APPARATUS, VISUAL CORTICAL IMITATION SYSTEM AND OBJECT SEARCH SYSTEM USING VISUAL CORTICAL CIRCUIT APPARATUS

(71) Applicant: KOREA ADVANCED INSTITUTE OF SCIENCE AND TECHNOLOGY, Daejeon (KR)

(72) Inventors: Il Song Han, Daejeon (KR); Woo Joon Han, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 88 days.

(21) Appl. No.: 15/014,013

(22) Filed: Feb. 3, 2016

(65) Prior Publication Data
US 2016/0162777 A1  Jun. 9, 2016

Related U.S. Application Data

(62) Division of application No. 14/374,917, filed as application No. PCT/KR2013/000568 on Jan. 24, 2013, now Pat. No. 9,286,566.

(30) Foreign Application Priority Data

Jan. 27, 2012  (KR) .................. 10-2012-0008372
Jun. 28, 2012  (KR) .................. 10-2012-0070092
Jul. 16, 2012  (KR) .................. 10-2012-0077192

(51) Int. Cl.
*G06N 3/04*    (2006.01)
*G06F 17/30*   (2006.01)
(Continued)

(52) U.S. Cl.
CPC ......... *G06N 3/04* (2013.01); *G06F 17/30247* (2013.01); *G06K 9/00986* (2013.01);
(Continued)

(58) Field of Classification Search
CPC .... G06K 9/4619; G06N 3/08; A61N 1/36046; A61N 1/0543; A61F 9/08
See application file for complete search history.

(56) References Cited

U.S. PATENT DOCUMENTS 5,648,926 A * 7/1997 Douglas ............... G06N 3/0635
                                                326/36
7,027,874 B1 * 4/2006 Sawan ............... A61N 1/36046
                                                607/116

FOREIGN PATENT DOCUMENTS

JP  09-167195 A   6/1997
JP  09-198366 A   7/1997
(Continued)

OTHER PUBLICATIONS

Han, Woojin et al. "Tunable linear conductance by two MOSFETs and its application to analogue-mixed VLSI for mobile communications and biologically plausible neuromorphic hardware" EHAC'09 Proceedings of the 8th WSEAS international conference on Electronics, hardware, wireless and optical communication. 2009, pp. 86-93, ISSN 1790-5117.*
(Continued)

*Primary Examiner* — Kim Vu
*Assistant Examiner* — Michael Vanchy, Jr.
(74) *Attorney, Agent, or Firm* — Park, Kim & Suh, LLC

(57) ABSTRACT

Provided us a visual cortical circuit apparatus comprising: a current mirror unit which uses a transistor as a current source to generate a current having the same size as that of a reaction; a transconductance unit which takes, as an input, the current generated by the current mirror unit and outputs
(Continued)

a voltage using a transconductance; and a buffer unit for converting the voltage output from the transconductance unit into a current and buffering the current.

13 Claims, 17 Drawing Sheets

(51) Int. Cl.
  *G06K 9/66* (2006.01)
  *G06K 9/46* (2006.01)
  *G06T 1/20* (2006.01)
  *G06K 9/62* (2006.01)
  *G06K 9/00* (2006.01)
  *G06N 3/063* (2006.01)
(52) U.S. Cl.
  CPC ............ *G06K 9/46* (2013.01); *G06K 9/4619* (2013.01); *G06K 9/6203* (2013.01); *G06K 9/66* (2013.01); *G06N 3/0635* (2013.01); *G06T 1/20* (2013.01)

(56) References Cited

FOREIGN PATENT DOCUMENTS

| KR | 10-2006-0089487 A | 8/2006 |
| KR | 10-2008-0049473 A | 6/2008 |

OTHER PUBLICATIONS

Han, W. J. et al. "Bio-inspired visual information processing—the neuromorphic approach" WSEAS Transactions on Circuits and Systems. Jul. 2010, vol. 9, Issue 7, pp. 441-452, ISSN 1109-2734.
International Search Report in International Application No. PCT/KR2013/000568, dated May 16, 2013.

\* cited by examiner

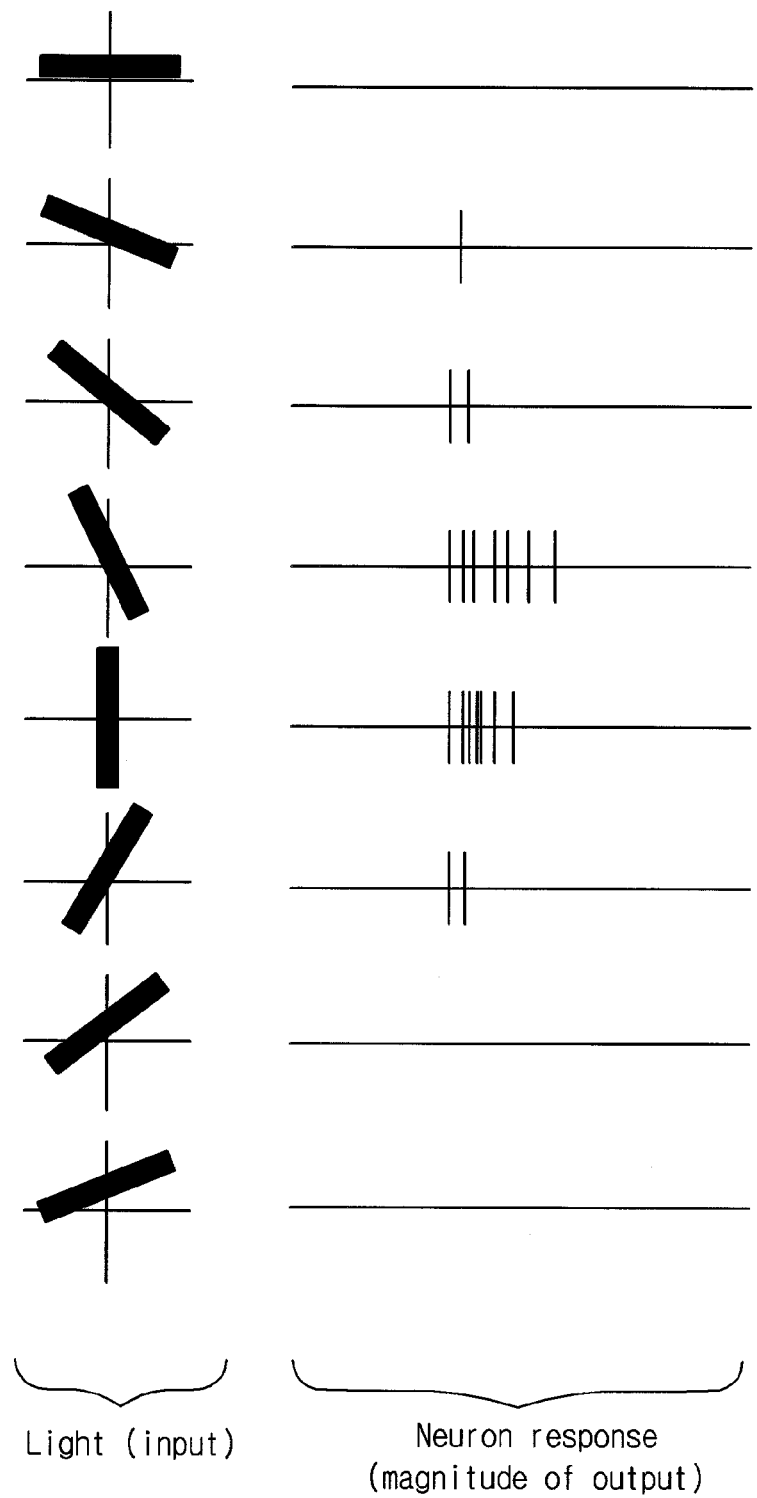

[Fig. 2]
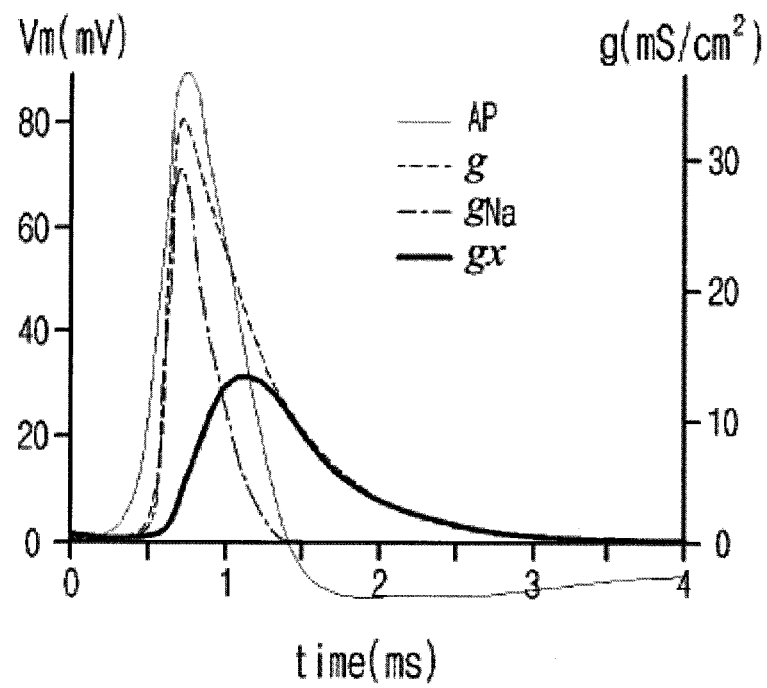
[Fig. 3]
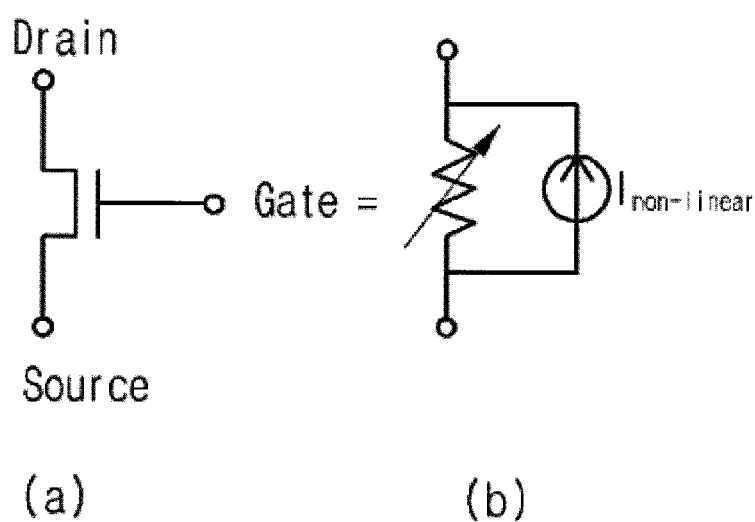
(a)          (b)

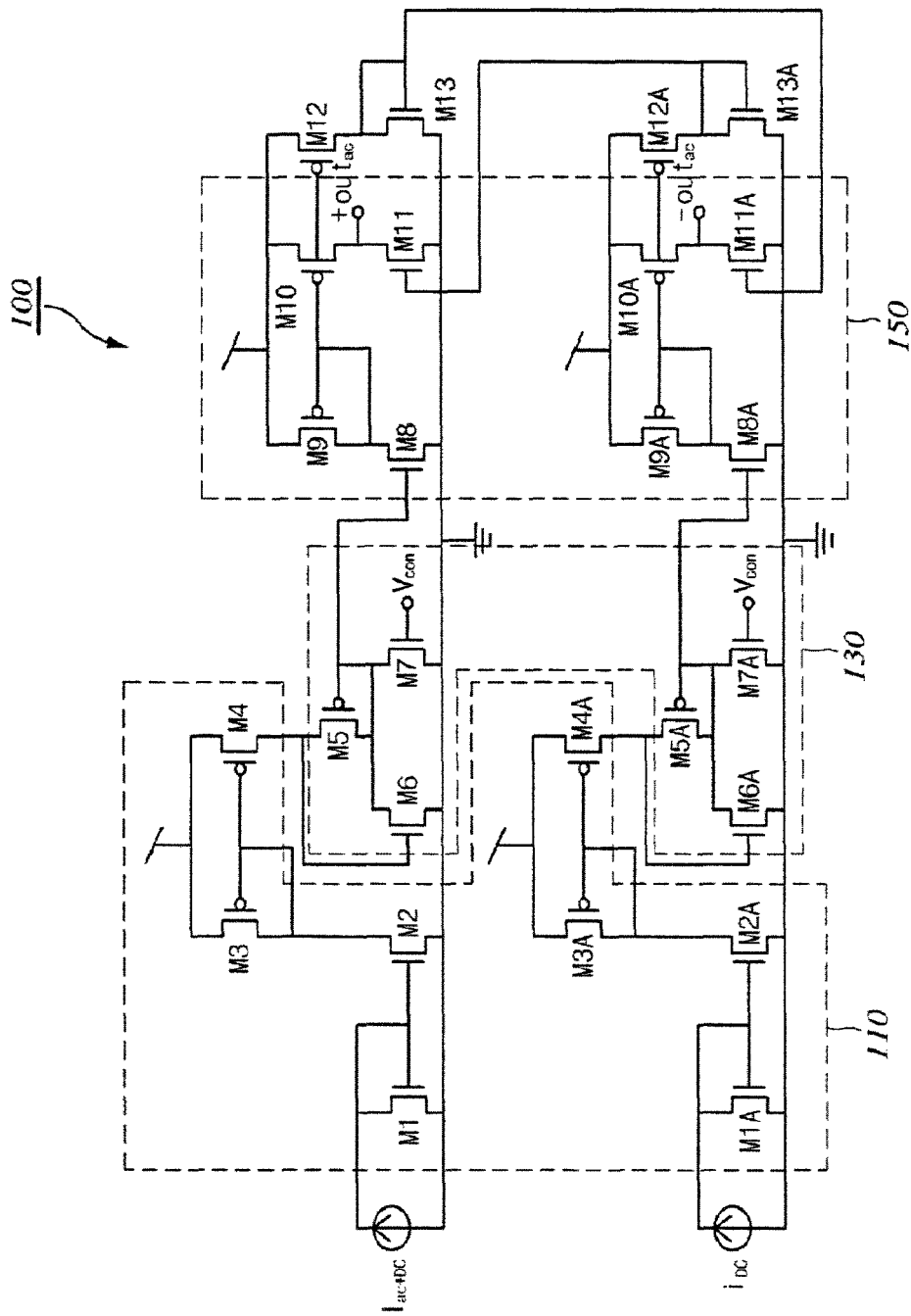
[Fig. 4]

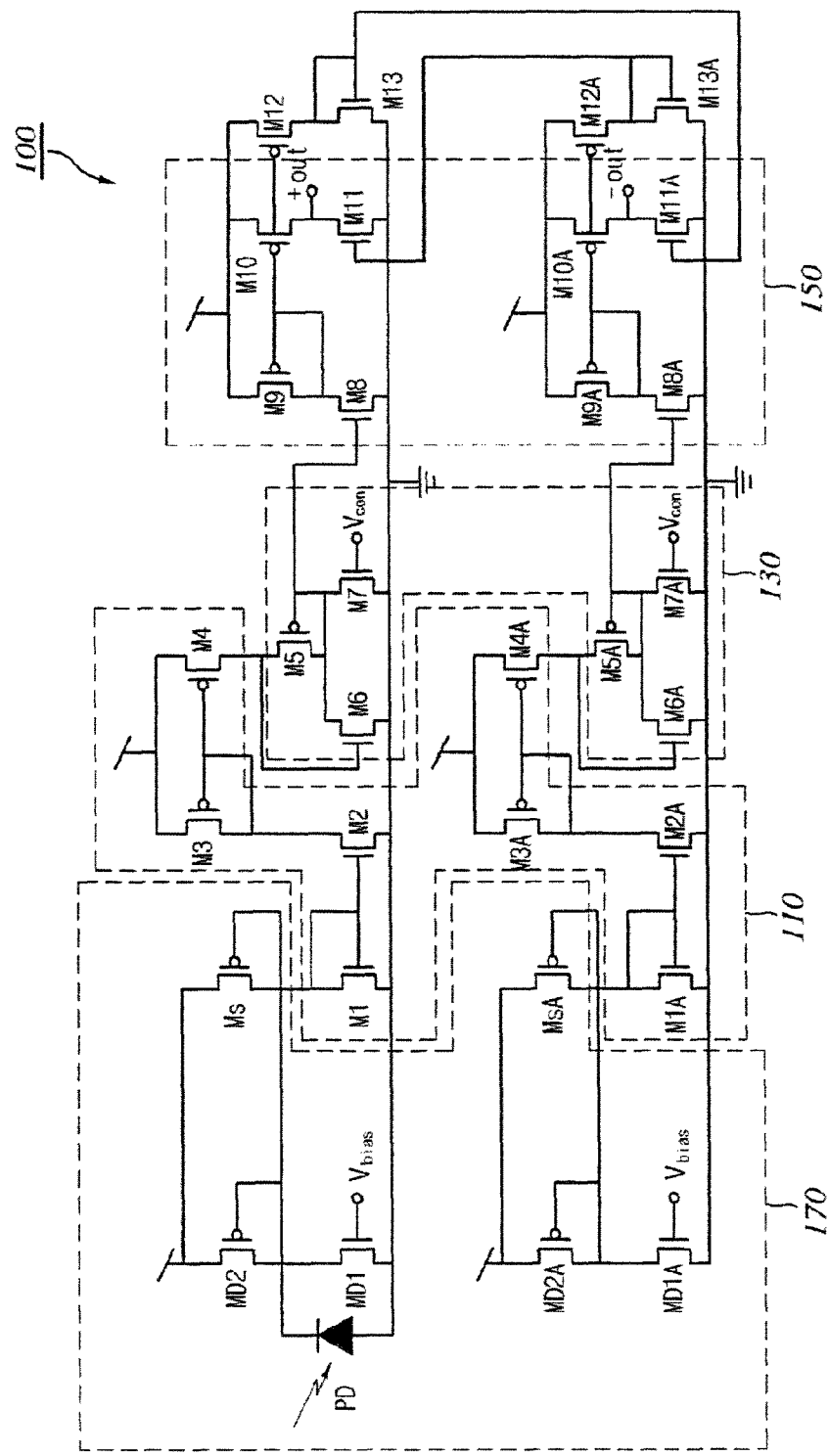
[Fig. 5]

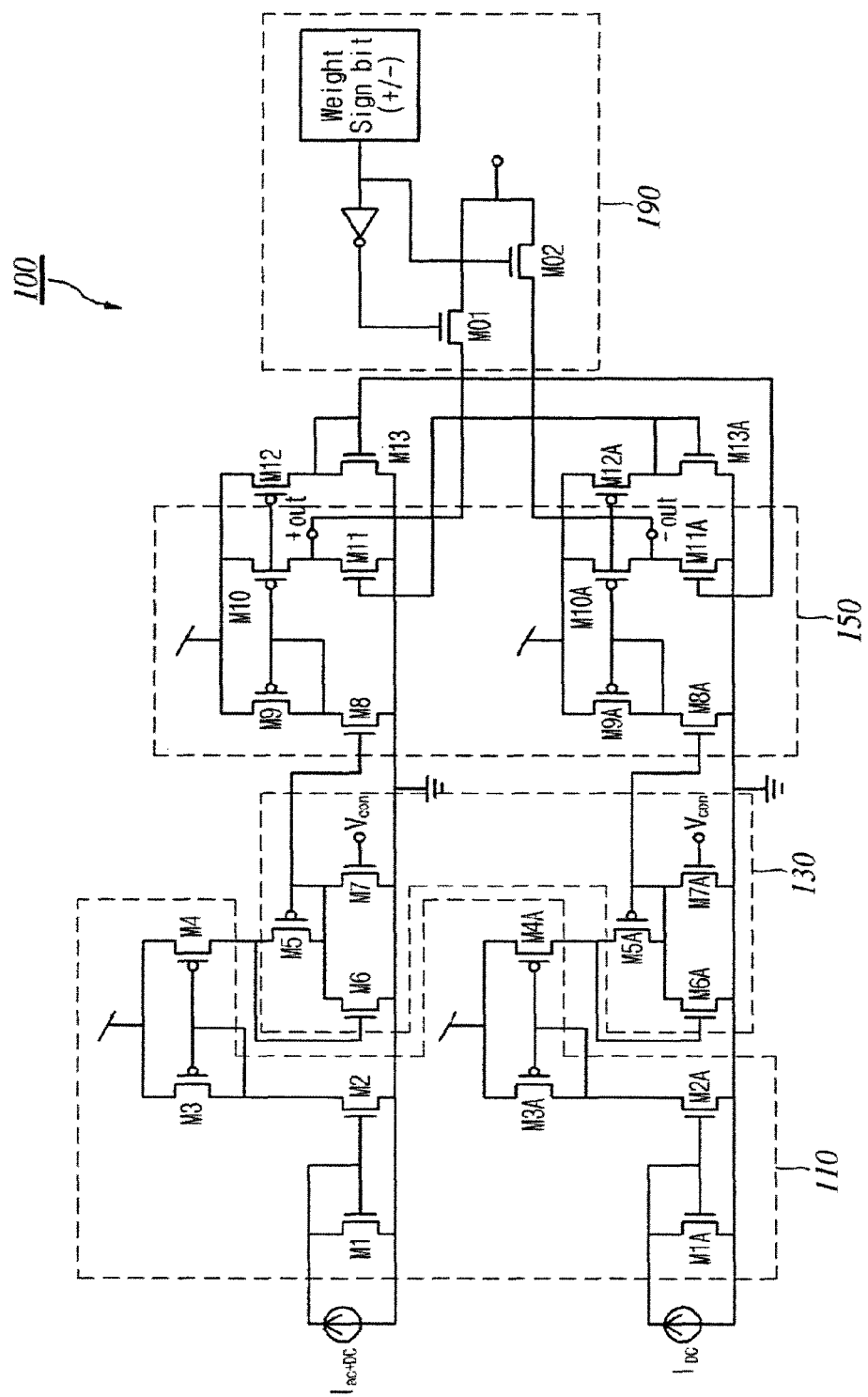
[Fig. 6]

[Fig. 7]
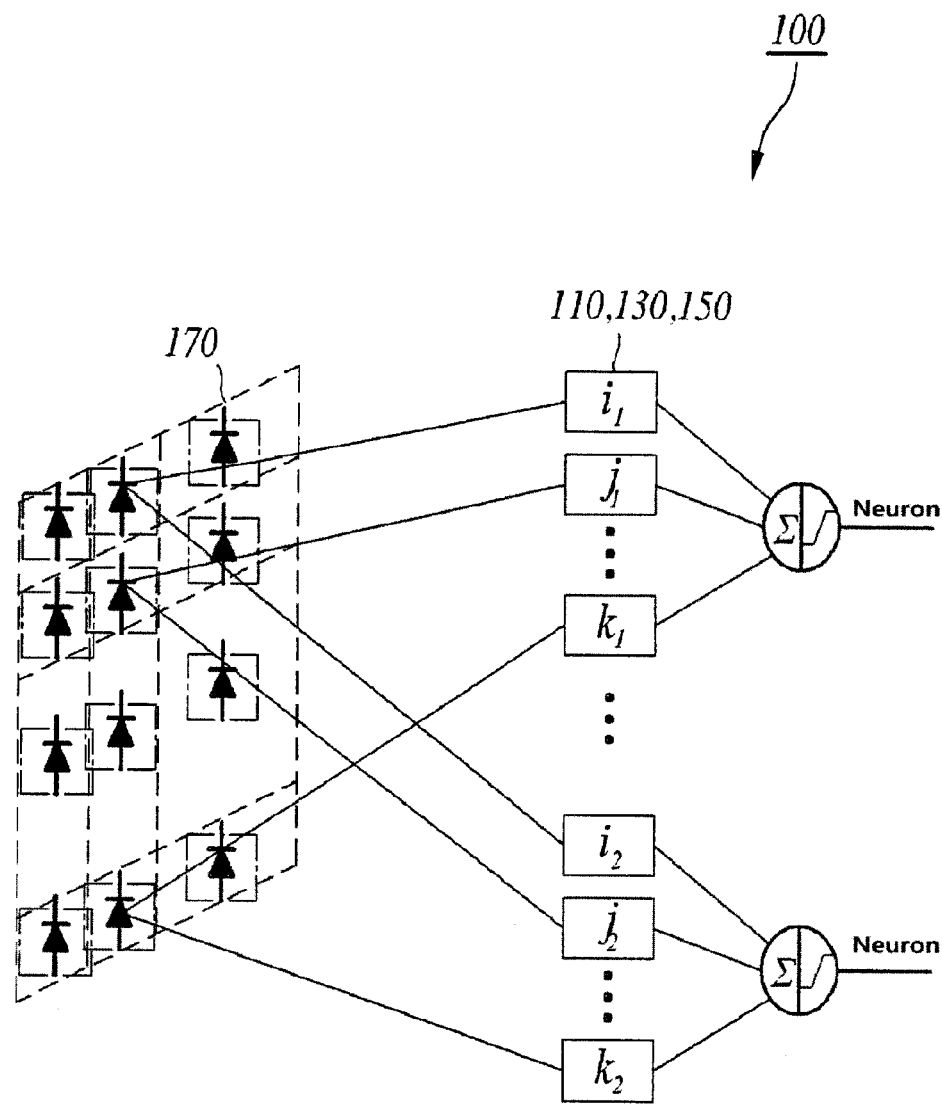

[Fig. 8]
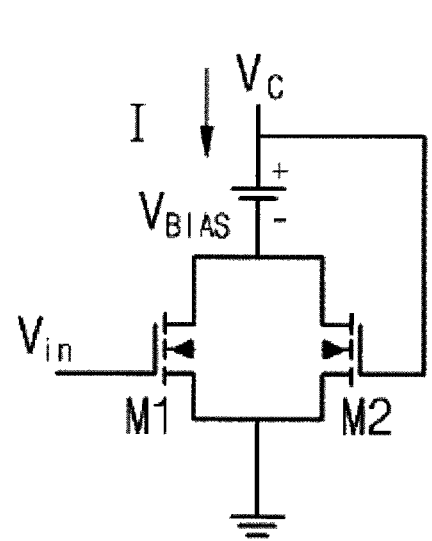
(a)
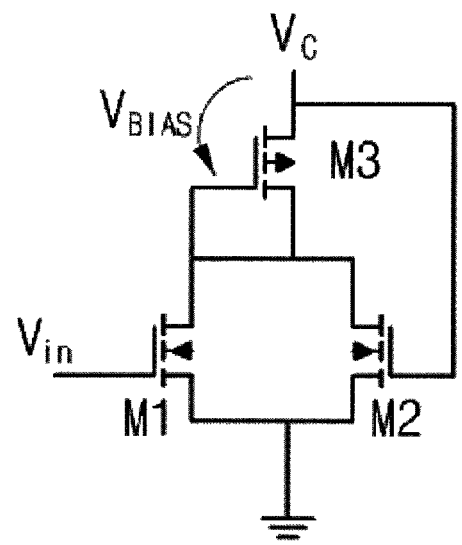
(b)

[Fig. 9]
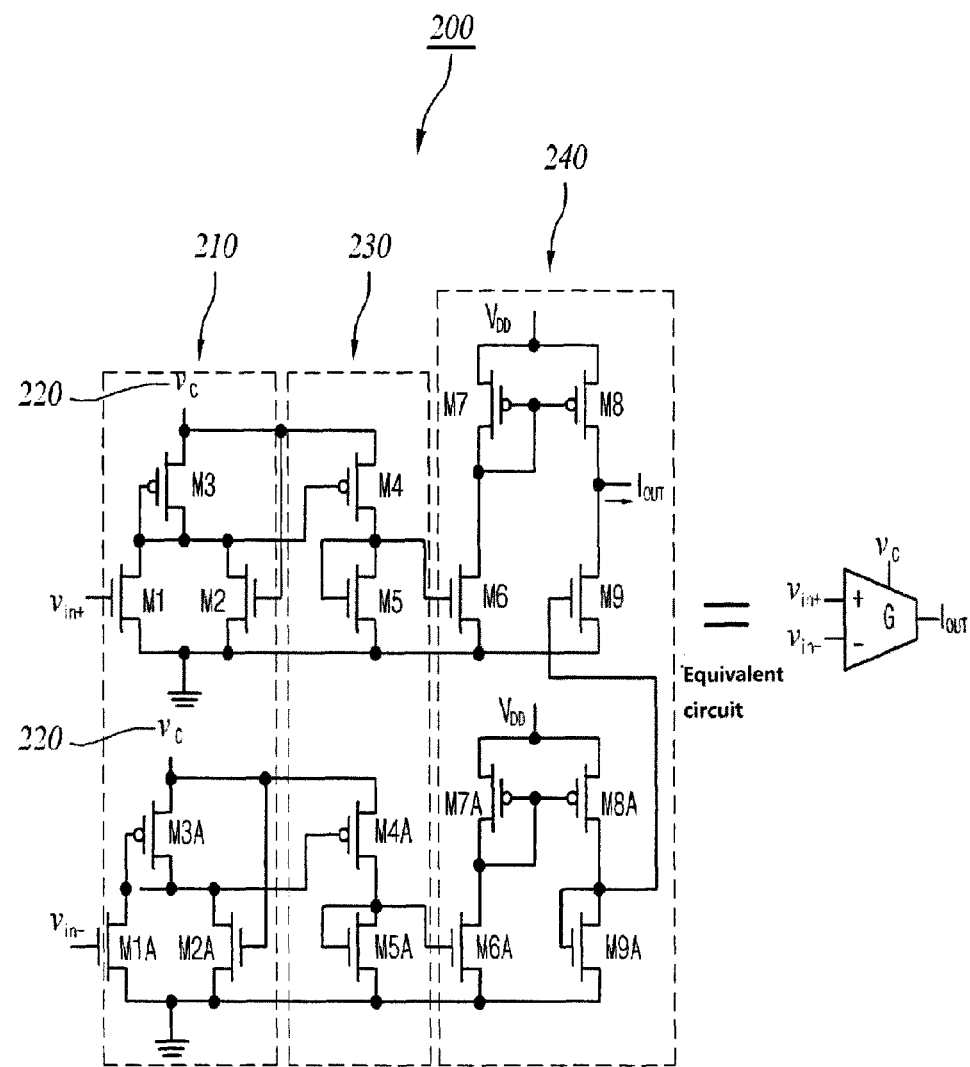

[Fig. 10]
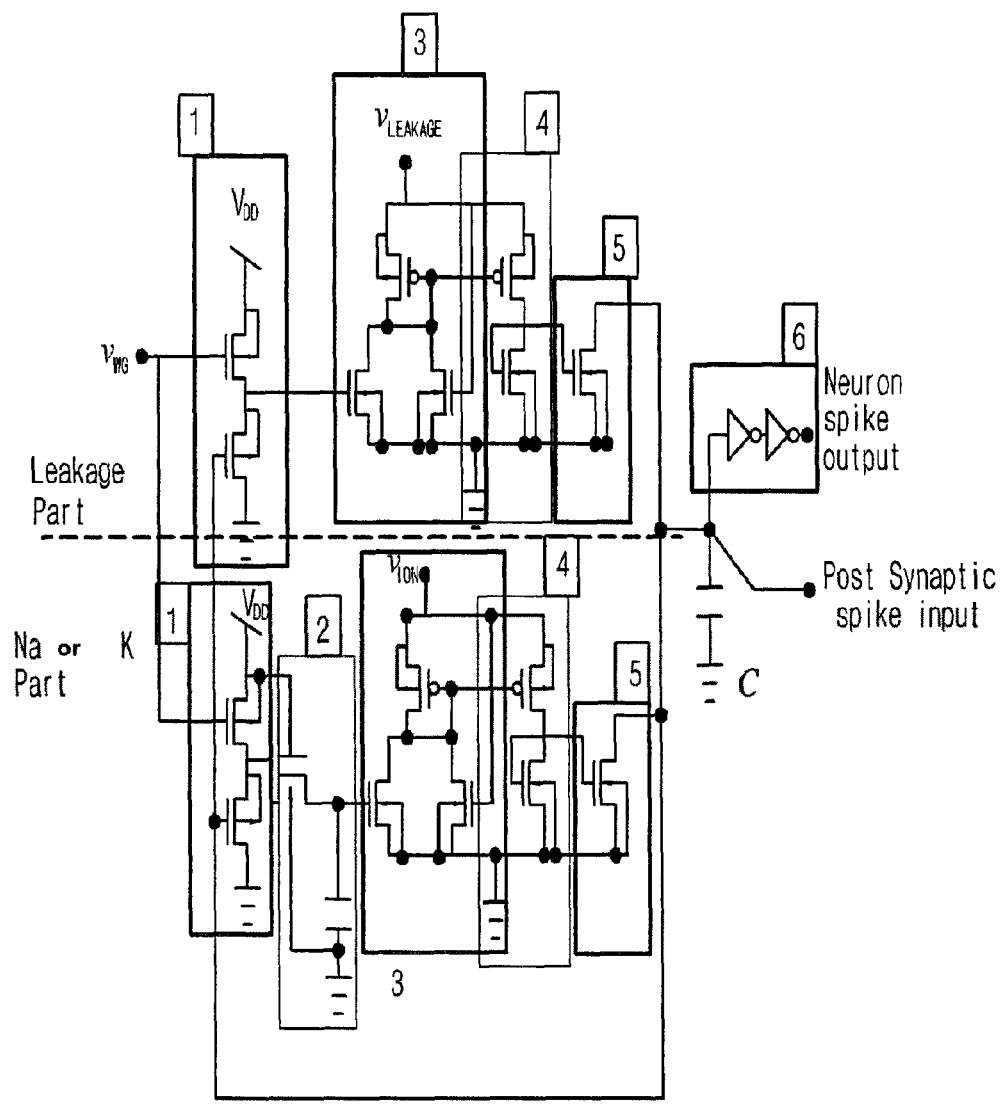

[Fig. 11]
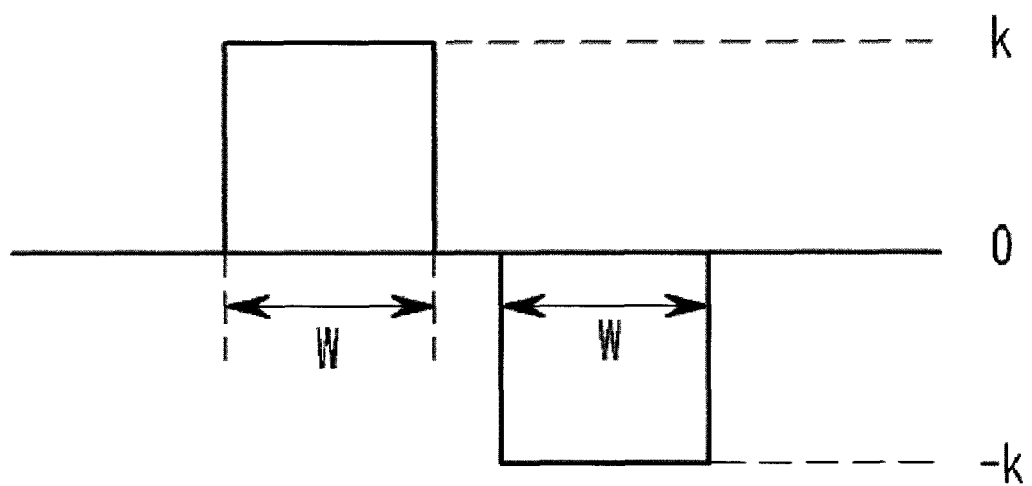

[Fig. 12]
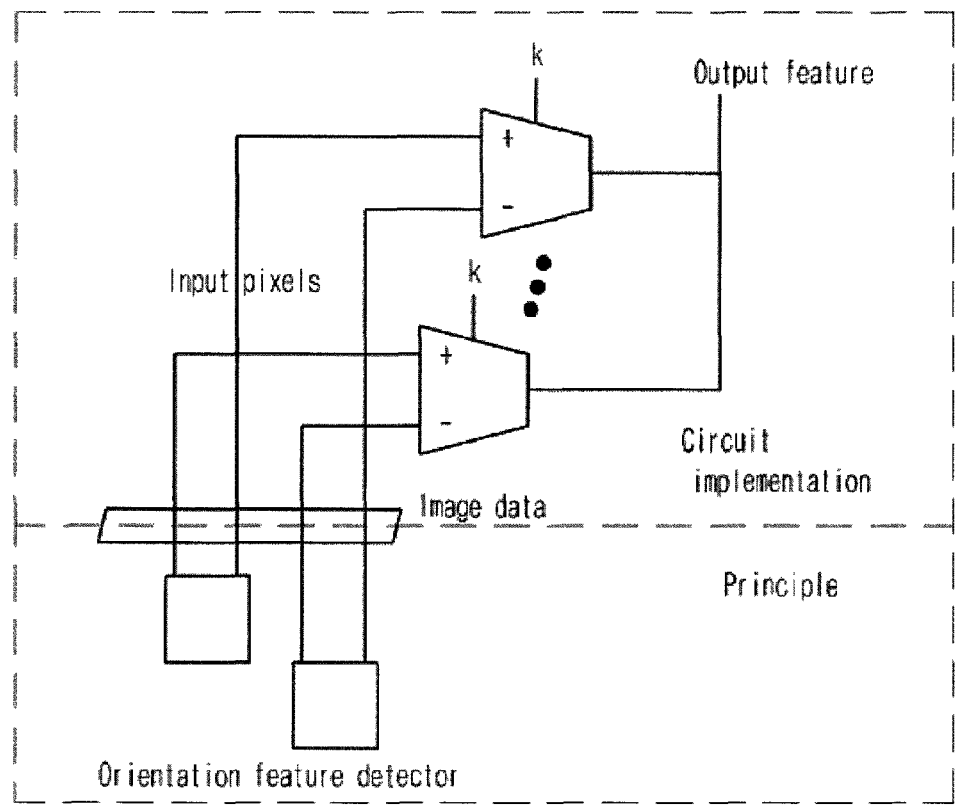

[Fig. 13]
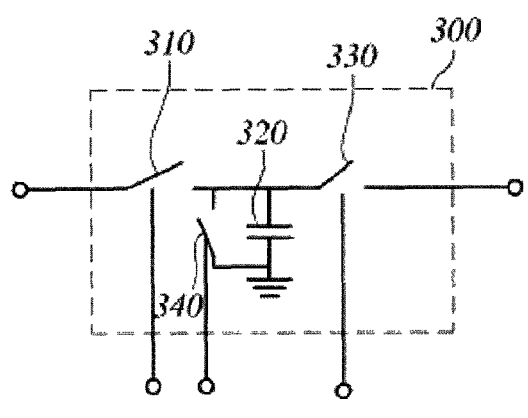
(a)
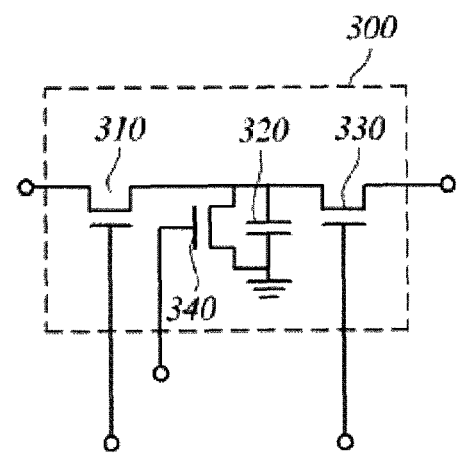
(b)

[Fig. 14]
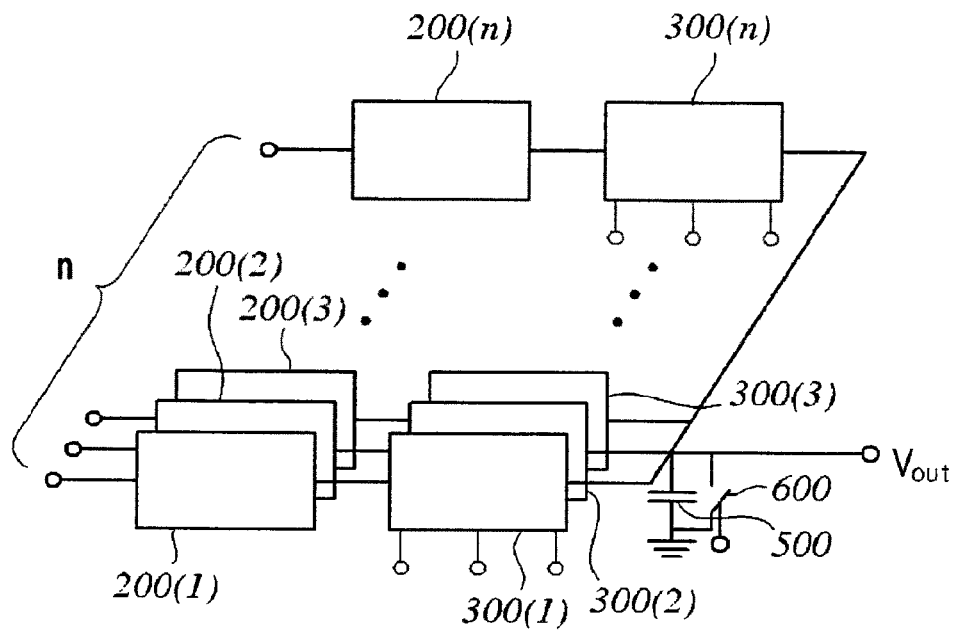
(a)
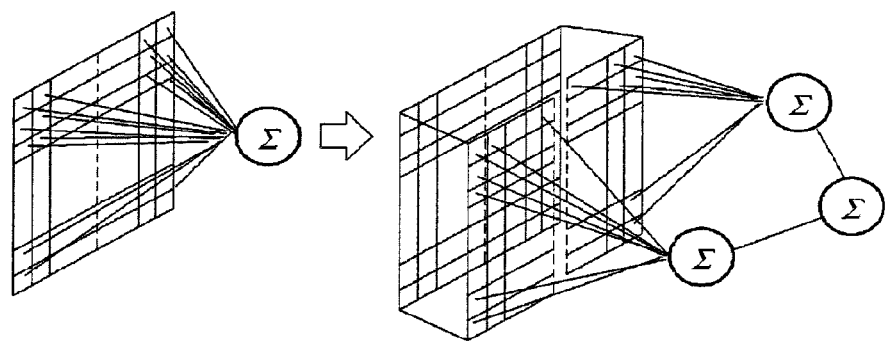
(b)

[Fig. 15]
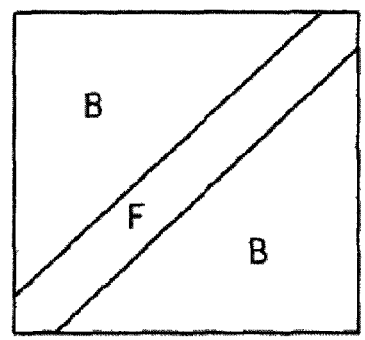
(a)
(b)

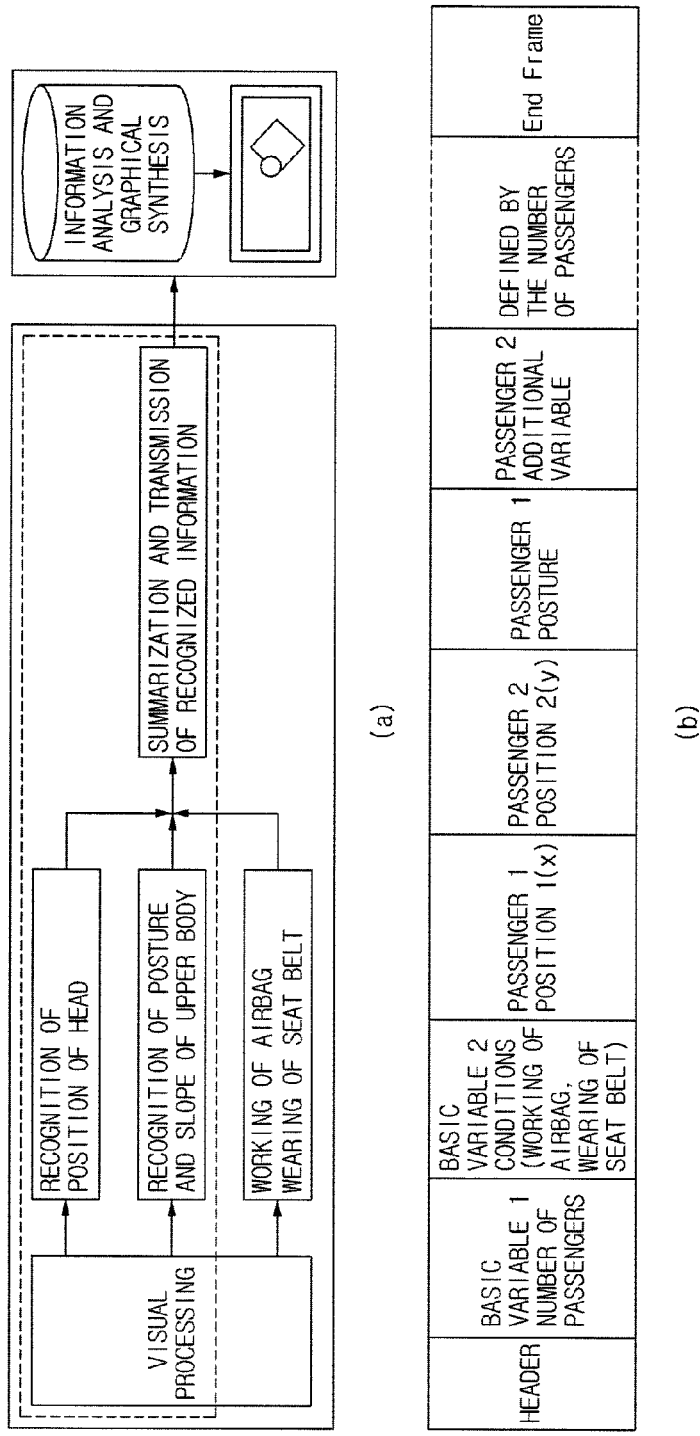
[Fig. 16]

[Fig. 17]
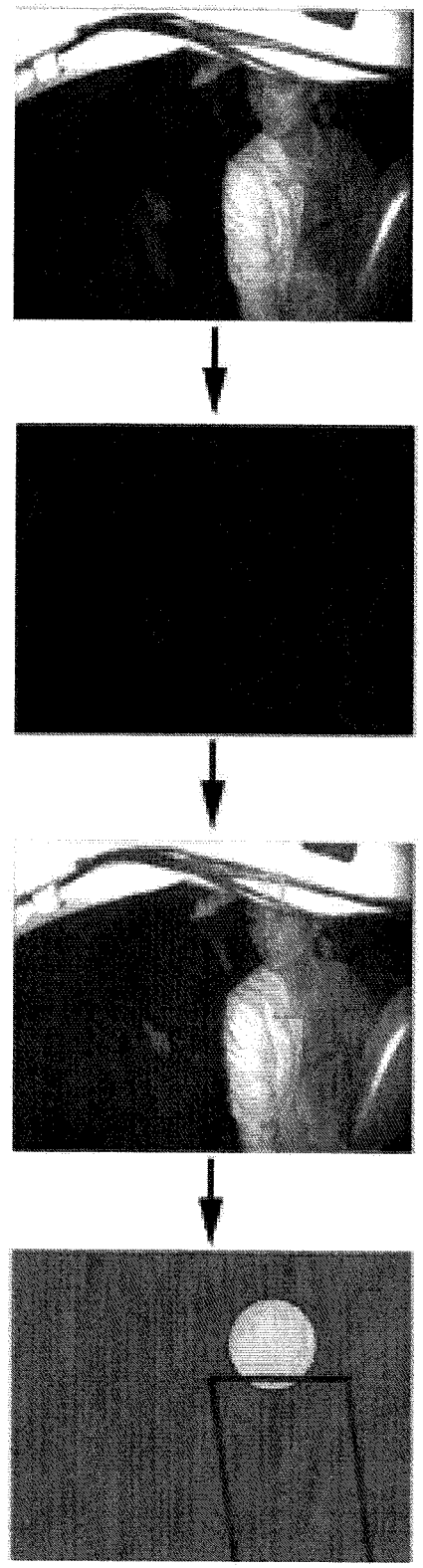

[Fig. 18]
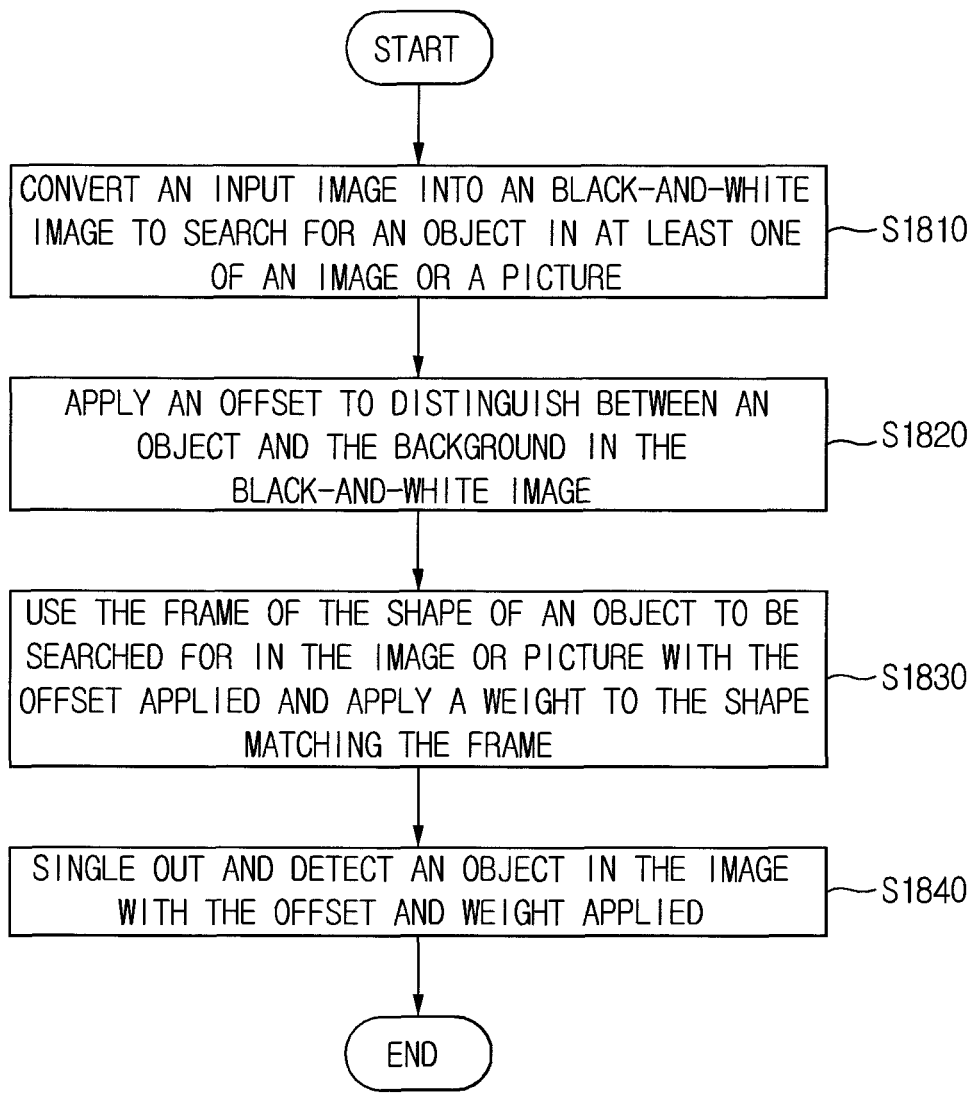

VISUAL CORTICAL CIRCUIT APPARATUS, VISUAL CORTICAL IMITATION SYSTEM AND OBJECT SEARCH SYSTEM USING VISUAL CORTICAL CIRCUIT APPARATUS

CROSS-REFERENCE TO RELATED APPLICATION

This application is a division of U.S. patent application Ser. No. 14/374,917, filed on Jul. 27, 2014, which is the national stage filing under 35 U.S.C. 371 of international application No. PCT/KR2013/000568, filed on Jan. 24, 2013, which claims the benefits of Korean Patent Application No. 10-2012-0008372, filed on Jan. 27, 2012, Korean Patent Application No. 10-2012-0070092, filed on Jun. 28, 2012, and Korean Patent Application No. 10-2012-0077192, filed on Jul. 16, 2012, all of which are hereby incorporated by reference herein in their entirety.

TECHNICAL FIELD

The present invention relates to a visual cortical circuit apparatus and a visual cortical imitation system and an object search system using the visual cortical circuit apparatus.

BACKGROUND ART

Recent technological advancements in systems neuroscience have allowed for the recognition of an object from an image, based on input and output patterns of cells constituting a visual system and the signal processing method of cells.

A neural network such as a semiconductor chip, which is designed to have a response similar to that of the human brain or neurons, has been designed so that the network connects a large number of simple elements through communication and thereby expresses and memorizes information. The neural network, made by imitating the structure of a neuron in the neural network of a human brain, is used as a core technology in artificial intelligence computers in areas of voice recognition, character recognition, image processing and understanding of natural language, and is being actively researched in many countries.

In this regard, the Korean publicized patent No. 2006-0089487, which deals with an apparatus for compensating images according to probabilistic neural network theory, discloses an apparatus that can provide a user with a high-quality image. However, when it comes to a specific method, the patent does not disclose a technique that can have the same precision as an optic nerve and miniaturize the apparatus.

DISCLOSURE

Technical Problem

An object of some embodiments of the present invention is to provide a visual cortical circuit apparatus that can offer a parallel structure implementable in the form of a small chip even when an object is located in unfavorable conditions, thus leading to a sharp increase in the number of visual cortical circuit apparatuses required for detecting the object, and an apparatus and a method for providing rescue information using the visual cortical circuit apparatus.

Technical Solution

In accordance with an aspect of the present invention, as a technical means to accomplish the above object, a visual cortical circuit apparatus comprises: a current mirror unit for using a transistor as a current source to generate a current having the same magnitude as that of a reaction; a transconductance unit for receiving, as an input, the current generated by the current mirror unit and outputting a voltage using transconductance; and a buffer unit for converting the voltage output by the transconductance unit into a current and buffering the current.

In accordance with another aspect of the present invention, a visual cortical imitation system using the visual cortical circuit apparatus comprises: a bias unit for applying a bias voltage to maintain a reference operating point when a magnitude of a reaction output by the visual cortical circuit apparatus over neuron response time is less than a predetermined threshold value; a current mirror unit for using a transistor as a current source to generate a current having the same magnitude as the current inputted by the bias unit; a transconductance unit for receiving, as an input, the current generated by the current mirror unit and outputting a voltage using transconductance; a buffer unit for converting the voltage output by the transconductance unit into a current and buffering the current; and a bipolar switching unit, wherein any one of outputs from the buffer unit is switched on if a membrane potential proceeds across a neuron so that the neuron becomes activated, and switched off if a membrane potential proceeds across a neuron so that the neuron becomes deactivated.

A visual cortical circuit apparatus according to a third aspect of the invention comprises: a transconductance unit for taking, as an input, a value with an offset applied to distinguish between the background of an image or picture and an object to be searched for; an externally-controlled voltage application unit for setting an offset; and a buffer unit for applying a weight by amplifying an input voltage or input current for the same frame as the pattern of the object.

An object search system using a visual cortical circuit apparatus according to a fourth aspect of the invention comprises: a conversion unit for converting an input image into a black-and-white image as a pre-treatment process to search for an object from an image or picture; a transconductance unit for receiving, as an input, a value with an offset applied to distinguish between the background of an image or picture and the object to be searched for; an externally-controlled voltage application unit for setting the offset; a buffer unit for applying a weight by amplifying an input voltage or input current for the same frame as the pattern of the object; and a search unit for singling out and detecting the object from an image with an offset and a weight applied.

Advantageous Effects

Any one of the technical solutions of the invention described above can provide a parallel structure implementable in the form of a small chip, even when an object is located in unfavorable conditions, thereby resulting in a sharp increase in the number of visual cortical circuit apparatuses required for detecting the object.

DESCRIPTION OF DRAWINGS

FIG. 1 is a diagram of cerebral cortex response for describing the concept of a visual cortical circuit apparatus according to an embodiment of the invention;

FIG. 2 is a graph of a response to stimuli for describing the concept of a visual cortical circuit apparatus according to an embodiment of the invention;

FIG. 3 illustrates a transistor and an equivalent circuit thereof for describing the concept of a transistor according to an embodiment of the invention;

FIG. 4 is a circuit diagram for describing a visual cortical circuit apparatus according to an embodiment of the invention;

FIG. 5 is a circuit diagram for describing a visual cortical circuit apparatus further having a bias unit in the visual cortical circuit apparatus in FIG. 4;

FIG. 6 is a circuit diagram for describing a visual cortical circuit apparatus further having a bipolar switch unit in the visual cortical circuit apparatus in FIG. 4;

FIG. 7 is a diagram for describing a visual cortical imitation system using a visual cortical circuit apparatus according to an embodiment of the invention;

FIG. 8 is a diagram for describing the concept of a transistor according to another embodiment of the invention;

FIG. 9 is a diagram for describing a visual cortical circuit apparatus according to another embodiment of the invention;

FIG. 10 is a circuit diagram for describing another embodiment of the visual cortical circuit apparatus in FIG. 9;

FIG. 11 is a diagram for describing the concept of an offset applied to the visual cortical circuit apparatus in FIG. 9;

FIG. 12 is a diagram for conceptually illustrating the visual cortical circuit apparatus in FIG. 9 with an offset applied;

FIG. 13 is a circuit diagram of a switched capacitor unit added to the visual cortical circuit apparatus in FIG. 9;

FIG. 14 is a circuit diagram of the parallel connection of the visual cortical circuit apparatus in FIG. 9;

FIG. 15 illustrates an embodiment of searching for an object using the visual cortical circuit apparatus in FIG. 9;

FIG. 16 illustrates an embodiment of generating rescue information using the visual cortical circuit apparatus in FIG. 9;

FIG. 17 is an example implementation of generating rescue information from an image, using the visual cortical circuit apparatus in FIG. 9; and FIG. 18 is a flow chart for describing an object search method using a visual cortical circuit apparatus according to another embodiment of the invention.

BEST MODE

From here on, an embodiment of the present invention is described in detail with reference to the accompanying figures, so that one skilled in the art to which the invention pertains can easily practice the invention. However, the invention can be implemented in many different ways and is not limited to the embodiment described herein. To clearly explain the embodiment of the invention, elements irrelevant to the explanation are omitted in the figures, and the similar reference numerals are used throughout the different drawings to designate similar components.

As used herein, the term "connection" of one portion to another includes the meaning of "electrical connection" of two portions having another element between the two, as well as "direct connection" between the two. In addition, the phrase "a portion includes a component" means that the portion can further include other components, rather than exclude other components, unless otherwise described, and should be understood in the sense that the possibility that one or more other features, numbers, steps, operations, components or parts, or the combinations thereof are present or can be added is not ruled out beforehand.

The terms "a first" and "a second" are used to distinguish one component from another and should not limit the scope of the rights to the invention. For example, a first component can be called a second component, and vice versa. Reference numerals in each step are used for convenience in explanation, and do not refer to the sequence of steps. The steps can be performed in a different order from the stated one, unless a specific order is mentioned in the context. In other words, the steps can be performed in the same order as the stated one, effectively simultaneously, or in the reverse order.

From here on, the invention is described in detail with reference to the accompanying figures.

FIG. 1 is a diagram of cerebral cortex response for describing the concept of a visual cortical circuit apparatus according to an embodiment of the invention, and FIG. 2 is a graph of a response to stimuli for describing the concept of a visual cortical circuit apparatus according to an embodiment of the invention.

FIG. 1 shows a response of a cat's cerebral cortex when light with directionality is cast on the cat's eyes. According to the Hodgkin-Huxley model and Hubei and Wiesel's experiment with the visual cortex, when light with directionality is cast on a cat's eyes, neurons of the cat's cerebral cortex come to have specific directionality and respond to stimuli in a specific direction. The left of FIG. 1 illustrates the shape or direction of the light, and the diagram on the right shows the magnitude of the response to the shape or direction of the light.

This shows that a brain is a set of neurons giving an independent stimulus to a specific directionality. A circuit implemented by imitating a visual cell yields precision similar to that of visual cortex.

Referring to FIG. 2, a neuron's response to stimuli over time can be expressed in a voltage and transconductance. In other words, if stimuli are presented to the visual cortex, the measurement of the neuron's response to stimuli over time can be expressed in the relation between voltage and transconductance (Vm–g).

Here, transconductance is the real component of transadmittance and is also called mutual conductance. In addition, the transconductance between gate and drain electrodes of a FET refers to the slope of a curve representing the relation between gate voltage $E_g$ and drain current $I_D$, which is expressed by $g_m = \partial I_D / \partial E_g$.

FIG. 3 illustrates a transistor and an equivalent circuit thereof for describing the concept of a transistor according to an embodiment of the invention.

In (a) and (b), a transistor can have a non-linear characteristic equivalent model for resistance or conductance. For example, while other transistors are a current control type, which uses the action of a carrier passing through a PN junction, the FET (Field Effect Transistor) may be a voltage control type, which controls electron flow in a semiconductor with another electrode.

In particular, in the triode region, the operation between the drain and source of a MOSFET (Metal Oxide Silicon Field Effect Transistor) is characterized by resistance or conductance having a current non-linearly proportional to an applied voltage. This can be shown by referring to the voltage-current characteristic graph of $V_{DS}$ and $i_D$ (voltage-current characteristic graph for N-channel MOSFET).

Here, although the N-channel MOSFET is taken as an example, the same principle also applies to the P-channel MOSFET. Since the P-channel MOSFET has the same circuit device structure except for the variation in accordance with the channel polarities of the transistor, it is obvious that the P-channel MOSFET can also be used to structure the circuit device.

The current-voltage relationship of the N-channel MOSFET in the triode region in FIG. 3 may be non-linear as can be seen in the Mathematical Equation 1 below because the current involves a second order voltage $V_{DS}$.

$$I_{DS} = K\left[(V_{GS} - V_T)V_{DS} - \frac{V_{DS}^2}{2}\right] \qquad \text{Mathematical Equation 1}$$

$$K = \frac{\mu C_{OX} W}{2L}$$

Here, $V_T$ is an individual parameter variable in accordance with the MOSFET manufacturing, $I_{DS}$ is a drain-source current, $V_{GS}$ is a gate-source voltage, and $V_{DS}$ is a drain-source voltage. L refers to the length between source and drain of the MOSFET, and W is the width of the MOSFET. $\mu C_{OX}$ is a constant determined by the process technology used for the MOSFET manufacturing and is also a process transconductance parameter. $\mu C_{ox}$ determines the transconductance value of the MOSFET, can be presented as K, and has a unit of A/V². This is shown in the Mathematical Equation 2 below.

$$k = \mu C_{OX} \qquad \text{Mathematical Equation 2}$$

FIG. 4 is a circuit diagram for describing a visual cortical circuit apparatus according to an embodiment of the invention.

Referring to FIG. 4, the visual cortical circuit apparatus 100 according to an embodiment of the invention may contain a current mirror unit 110, a transconductance unit 130 and a buffer unit 150.

The current mirror unit 110 may use a transistor as a current source to generate a current having the same magnitude as that of a reaction. Here, the visual cortical circuit apparatus 100 may be a symmetrical operational amplifier, and the operational amplifier may be an analog operational amplifier. Therefore, the current mirror unit 110 may comprise at least one current mirror, and the at least one current mirror may be connected in parallel in up/down symmetry.

Referring to the top of the visual cortical circuit apparatus 100 in FIG. 4, the current mirror unit 110 may contain a first current mirror having N-channel MOSFETs M1 and M2 and a second current mirror having P-channel MOSFETs M3 and M4. The current source signal input may be transmitted to the transconductance unit 130 through the first current mirror and the second current mirror.

The current mirror is a circuit designed to duplicate a current through one active element by controlling the current of another active element in the circuit in order to maintain a certain level of output current, regardless of the load. Here, the current can be duplicated and may be one of various signal currents. The current mirror may provide an active load for a bias current and a circuit.

The transconductance unit 130 may receive, as an input, the current generated by the current mirror unit 110 and output a voltage using transconductance. Here, the visual cortical circuit apparatus 100 may be a symmetrical operational amplifier, and the transconductance unit 130 may be an equivalent circuit of a differential transconductance amplifier.

Therefore, the transconductance unit 130 may contain at least one transconductance circuit and the at least one trandsconductance circuit may be connected in parallel in up/down symmetry.

The transconductance circuit of the transconductance unit 130 may comprise P-channel MOSFET M5 and N-channel MOSFETs M6 and M7. Here, the transconductance unit 130 may control the properties of a terminal with a voltage applied to the gate of M7 and output a voltage by multiplying by the current source input signal.

This can be expressed by the Mathematical Equation 3 below. However, the equation is presented with the focus on the second order term as a main cause of non-linearity. Here, diodes are connected at the voltage of both ends represented by $V_D$, and this does not affect the operational principle.

$$I_{M6} = K\left[(V_X - V_T) \cdot (V_X - V_D) - \frac{(V_X - V_D)^2}{2}\right] \qquad \text{Mathematical Equation 3}$$

$$I_{M7} = K\left[(V_{con} - V_T) \cdot (V_X - V_D) - \frac{(V_X - V_D)^2}{2}\right]$$

$$I_{total} = I_{M6} + I_{M7} =$$

$$K \cdot (V_{con} + V_D - 2V_T) \cdot (V_X - V_D)$$

The definitions for the Mathematical Equation 3 above are described above and, therefore, are omitted due to redundancy. Here, the Mathematical Equation 4 below shows the end-to-end current-voltage characteristics of the voltage-controlled resistance or conductance of the MOSFETs M5, M6 and M7.

$$I = G \cdot (V_X - V_D)$$

$$G = K \cdot (V_{con} + V_D - 2V_T) \qquad \text{Mathematical Equation 4}$$

Here, $V_D$ is a fixed constant and I and $V_X$ are signals. Both of K and $V_{con}$ are fixed constants.

Therefore, the MOSFETs M5, M6 and M7 may have the characteristics of voltage-controlled linear resistance or conductance, and since the result of the multiplication of the current source input signal and the resistance can be expressed as $V_X$ or the drain voltage of M6 and M7, the current source input signal can be presented as a voltage.

The buffer unit 150 may convert the voltage output by the transconductance unit 130 into a current and buffer the current. Here, the buffer may be a separated device or reaction absorption device that is disposed between a driving device and a driven device in order to prevent the driving device from receiving a reaction from the driven device. To this end, the buffer unit 150 may have a high input impedance and a low output impedance, and may prevent a counter flow of the current. Here, since the visual cortical circuit apparatus 100 may be a symmetrical operational amplifier, the buffer unit 150 may contain at least one buffer circuit and the at least one buffer circuit may be connected in parallel in up/down symmetry.

Since at least one visual cortical circuit apparatus 100 can respond to one arithmetically processed current source output, the parallel connection of the at least one visual cortical circuit apparatus 100 may allow the designing of VLSI with the capability of complex operations.

The visual cortical circuit apparatus 100 may be connected to another in a parallel or serial fashion or a combination thereof, and may comprise at least one or at least one combination of BJT (Bipolar Junction Transistor), JFET (Junction Field-Effect Transistor), MOSFET (Metal-Oxide Semiconductor Field-Effect Transistor) and GaAs MESFET (Metal Semiconductor FET).

FIG. 5 is a circuit diagram for describing a visual cortical circuit apparatus further having a bias unit in the visual cortical circuit apparatus in FIG. 4. Referring to FIG. 5, the visual cortical circuit apparatus 100 according to an embodiment of the invention may further contain a bias unit 170 for applying a bias voltage so that the current mirror unit 110 can remain in the operational state when the magnitude of a reaction is less than a predetermined threshold value.

Here, biasing means moving the operating point backward from the origin so that, with a voltage already applied in a forward direction, a current starts flowing as soon as a signal input occurs, since a signal input lower than a certain level does not cause the current to flow when a voltage is not applied between a base and an emitter in the transistor.

Here, when an output signal y is desired for an input signal x for automatic control, where a and b are integers, moving the origin backward by b, as in y=b+ax, rather than y=ax, is called biasing by b. Consequently, the reduction of the signal by the size of b at the output stage can lead to the extraction of only the original signal.

Therefore, the bias unit 170 may be symmetrical, and the output current resulting from biasing may be eliminated in the buffer unit 150.

In other words, when the current source input signal in a vision sensor is extremely weak, the current mirror unit 110 may not operate in the normal operation region and therefore biasing may be used. Therefore, only the first current source input signal can go through final operation processing by adding only the variation in the current source input signal within the minimum current range to the normal criteria for biasing.

FIG. 6 is a circuit diagram for describing a visual cortical circuit apparatus further having a bipolar switch unit in the visual cortical circuit apparatus in FIG. 4. Referring to FIG. 6, the visual cortical circuit apparatus 100 according to an embodiment of the invention may further contain a bipolar switch unit 190 for selectively switching a bipolar signal output.

A visual cortical imitation system modeled on brain should be designed in such a way that more nerve stimuli should lead to the activation of new neurons and fewer nerve stimuli should lead to the deactivation of new neurons, in order to perform similar functions to those of the brain.

The bipolar switch unit 190 may switch on any one of outputs from the buffer unit 150 a membrane potential proceeds across a neuron so that the neuron becomes activated, and may switch off any one of outputs from the buffer unit 150 a membrane potential proceeds across a neuron so that the neuron becomes deactivated.

In other words, for activation, the switch MOSFET MO1 is turned on to make the upper end output of the visual cortical circuit apparatus 100 effective and, at the same time, the switch MOSFET MO2 is turned off to make the lower end output of the visual cortical circuit apparatus 100 ineffective. On the contrary, for deactivation, the MOSFET MO1 is turned off to make the lower end output of the visual cortical circuit apparatus 100 effective and, at the same time, the MOSFET MO2 is turned on.

FIG. 7 is a diagram for describing a visual cortical imitation system using a visual cortical circuit apparatus according to an embodiment of the invention. FIG. 7 is also a schematic diagram of the neural network of visual cortex implemented using the visual cortical circuit apparatus 100 according to an embodiment of the invention.

The output and connection of a single pixel sensor may be presented as the action in the bias unit 170, and multiple connections to many synapses and neurons may be presented as the combined action in the current mirror unit 110, the transconductance unit 130, the buffer unit 150 and the bipolar switching unit 190 (not shown).

FIG. 8 is a diagram for describing the concept of a transistor according to another embodiment of the invention. Referring to FIG. 8, (a) represents transconductance in terms of a current I, and (b) represents transconductance in terms of a voltage V. The circuits (a) and (b) may comprise a linear conductance circuit whose voltage is controlled by a pair of NMOS (N Metal Oxide Semiconductor) transistors M1 and M2. This can be applied to various neural networks, from active synapses to neurons.

FIG. 9 is a diagram for describing a visual cortical circuit apparatus according to another embodiment of the invention. Referring to FIG. 9, a visual cortical circuit apparatus 200 contains a transconductance unit 210, an externally-controlled voltage application unit 220 and a buffer unit 240. Here, the visual cortical circuit apparatus 200 may further contain a current mirror unit 230.

When constructing a circuit outputting a voltage equivalent to a neuron's response to stimuli over time, the characteristics of a biological cell can be applied. Here, one circuit may correspond to one neuron. Therefore, the chip made by connecting in parallel one or more of these circuits can perform functions similar to those of brain. However, modifications should be made to fit the voltage characteristics of a neuron and the characteristics of each connection between neurons should be considered.

The visual cortical circuit apparatus 200 may present the response of a neuron in visual cortex to stimuli over time in the form of a voltage, and may output a voltage equivalent to the presented voltage. However, the visual cortical circuit apparatus 200 may have a visual cortical circuit representing a connection between neurons or between a neuron and a sensor, with a weighted synapse imposed therebetween, as in the neural network of the brain.

The transconductance unit 210 can be implemented to imitate the action potential of biological neural cell and the characteristics of selective transconductance for each cell membrane ion. Also, the externally-controlled voltage application unit 220 may apply a voltage to the transconductance unit 210 in order to enable the further programming of the calculated current of the transconductance.

The current mirror unit 230 may duplicate the output current from the transconductance unit 210 and prevent a counter flow by mirroring the output voltage from the transconductance unit 210.

The buffer unit 240 can prevent a counter flow of voltage by buffering the output voltage fed back from the output stage.

FIG. 10 is a circuit diagram for describing another embodiment of the visual cortical circuit apparatus in FIG. 9. Referring to FIG. 10, the top and bottom may correspond to the Leakage portion and Na or K portion, respectively. Here, the additional parallel connection between each portion may lead to the creation of N portions.

① may correspond to a buffer unit. The buffer unit buffers a voltage fed back from the output stage of the circuit to prevent a counter flow of the voltage, and amplifies an input voltage. ② may correspond to a delay unit and delay an input in order to cause the same effect as a delayed response in a specific line. The delay time can be adjusted depending on the parameter setting.

③ may correspond to a transconductance unit and ④ may correspond to a current mirror unit.

⑤ may correspond to a voltage emission unit and may play a role of emitting a voltage in order to cause a voltage response to drop after a peak response. Therefore, when the voltage emission unit is added to the visual cortical circuit apparatus 200, another voltage input after a peak response can cause the next peak response only after the lapse of a certain period of time. This is intended to generate the same effect as the quiescence of a cell. In other words, external stimuli do not generate any response during the quiescence following the occurrence of a spike.

⑥ may correspond to a shaping unit. Here, the shaping unit plays a role of shaping an input waveform and then outputting the waveform, and enables the waveform to appear in the form of pulse.

Meanwhile, the empirical mathematical formula of conductance elements is expressed by the Mathematical Equation 5, where b represents a sigmoid function of membrane potential. Vm refers to membrane potential and can be dynamically modeled on the whole by the conduction of active potential and relevant ions.

$$G_{ion} = G_{ionmax} \cdot x$$
$$\frac{dx}{dt} = \alpha(b - x)$$
$$i_{ion} = G_{ion}(V_m - E_{ion})$$

Mathematical Equation 5

Mathematical Equation 5 is controlled by conductance, multiplication, addition, subtraction and differential equation. In Mathematical Equation 5, the differential equation may be implemented by the LPF (Low Pass Filter) and may cause a delayed response. According to the equation, a neuron may be understood to electrically behave as ion-based conductance controlled by membrane potential for the biologically dynamic action thereof.

FIG. 11 is a diagram for describing the concept of an offset applied to the visual cortical circuit apparatus in FIG. 9, and FIG. 12 is a diagram for conceptually illustrating the visual cortical circuit apparatus in FIG. 9 with an offset applied.

Referring to FIGS. 11 and 12, for a certain width (W), positive (+) and negative (−) offsets (k) can be applied. In other words, applying the offset of +k to pixels for the background of a target object for detection and the offset of −k to pixels for the target object before applying a weight may make the target object for detection stand out in the black-and-white background.

For example, it is assumed that a positive value is applied to the background and the offset value is applied to the black-and-white image so that the pattern as an object can have a negative value. Here, the offset is added to the pixel values for an area corresponding to the background, the offset is subtracted from the pixel values for an area corresponding to the object, and then a weight frame is applied.

Accordingly, the background in the image comes to have a higher value, in comparison with the object to be searched for. In other words, the application of a positive value to the background and of a negative value to the target object leads to a wider gap between the two. For example, the background can be expressed as dark and the object can be expressed as bright, thereby increasing selectivity.

Here, the offset depends on the type of the image or object. For example, the offset can be set as the average of pixel values of the black-and-white image.

Therefore, not only in an ideal algorithm, but also in a dynamic image having the same precision as that of an image perceived by human or animal vision, the application of an offset before the application of a weight frame may correctly detect an object to avoid any noise or error.

FIG. 13 is a circuit diagram of a switched capacitor unit added to the visual cortical circuit apparatus in FIG. 9. Referring to FIG. 13, the switched capacitor unit 300 may include a first switch 310, a capacitor 320, a second switch 330 and a third switch 340.

Here, the first switch 310 may allow output current from the buffer unit 200 to flow for a certain period of time. The electric charge (Q) stored in the capacitor 320 for the certain period of time ($T_{on}$), during which the first switch 310 is connected, is presented in the Mathematical Equation 6 below.

$$Q = CV = i \cdot T_{on}$$

Mathematical Equation 6

The capacitor 320 is connected in parallel to the first switch 310 and may store the output current from the buffer unit 200 as electric charge. This is shown in the Mathematical Equation 6 above. The second switch 330 may be connected in parallel to the capacitor 320 and be connected in series to the first switch 310. Here, the first switch 310 and the second switch 330 may have separate On/Off timing. The third switch 340 may discharge the residual charge of the capacitor 320 before the first switch 310 is electrically connected. Here, the switched capacitor unit 300 can be implemented in the form of either (a) or (b) of FIG. 13.

To sum up the charge stored in the capacitor 320, the visual cortical circuit apparatus 200 should be connected in parallel, which is described with reference to FIG. 14.

FIG. 14 is a circuit diagram of the parallel connection of the visual cortical circuit apparatus in FIG. 9. Referring to (a) of FIG. 14, an example of n visual cortical circuit apparatuses 200 connected in parallel is taken for explanation.

If n visual cortical circuit apparatuses 200 are connected in parallel, the charge (Q) and voltage (V) stored in each of the switched capacitor units 300(1), 300(2), . . . , 300(n) can be expressed by the Mathematical Equation 7 below.

$$Q_{tot} = \sum Q$$
$$V_{tot} = \frac{Q_{tot}}{nC}$$

Mathematical Equation 7

The sum of the charges (Q) stored in each of the capacitors 320 is a total charge ($Q_{tot}$), and the total charge divided by the multiplication of the number of capacitors 320 by the capacitance yields a total voltage. This can be inferred from a simple principle that for capacitors in parallel connection, the sum of each electric charge equals the total charge.

Therefore, when at least one visual cortical circuit apparatus 200 is connected in parallel, the output voltage may be calculated based on the sum of electric charges stored in at least one switched capacitor 300. To this end, the visual cortical circuit apparatus 200 may further contain an integrated capacitor 500 and an integrated switch 600.

Here, the integrated switch 600 may be equipped in order to discharge the residual charge of the integrated capacitor 500 before the visual cortical circuit apparatus 200 is electrically connected. The addition of the integrated switch 600 may change the Mathematical Equation 7 above into the Mathematical Equation 8 below.

$$V_{out} = \frac{Q_{tot}}{nC + C_o} < V_{tot}$$

Mathematical Equation 8

Here, $C_O$ refers to the capacity of the integrated capacitor 500. The integrated capacitor 500 may prevent the output saturation caused by the interlocking of massive neural synapses, as well as sum the output voltages ($V_{out}$). For example, the integrated capacitor 500 may have the same effect as the multiplication of a coefficient less than 1. Here, the on-time of the second switch 330 of at least one visual cortical circuit apparatus 200 is necessary for charge redistribution, and therefore does not matter.

Referring to (b), the visual cortical circuit apparatus 200 has two parallel structures. Since an unlimited number of parallel structures, not just two, is possible due to the current-source basis, the operation requiring a structure of massive synapses can be implemented in a small chip.

Meanwhile, the switched capacitor unit 300 is necessary because the interlocking of 1,500 to 2,000 synapses per neuron may be required in unfavorable conditions for searching for an object. Here, the directional operation, an early visual intelligence phase of brain, may require the interlocking of 100 to 200 synapses on a relatively small scale. These conditions may serve as a constraint in the miniaturization of semiconductor chips or the implementation of VLSI or imbedded systems.

Therefore, the switched capacitor unit 300 can solve the problem of the interlocking of massive synapses and meet the criteria for miniaturization by using the fact that the neuronal activation degree is determined by the accumulation of positive/negative currents transmitted from the synapses. In other words, the switched capacitor unit 300 may store the current source, which is the result of the operation by synapses split in a certain unit, in each capacitor in the form of an electric charge, and then connect all capacitors for the whole operation, thereby meeting the criteria for miniaturization.

Also, since the sum of electric charges stored in each capacitor may have a potential equivalent to the total voltage, the use of the switched capacitor unit 300 can solve the problem of the interlocking of massive synapses and miniaturize semiconductor chips, which is required in unfavorable conditions.

FIG. 15 illustrates an embodiment of searching for an object using the visual cortical circuit apparatus in FIG. 9. Referring to (a) of FIG. 15, F is defined as an object and B is defined as the background. Here, an offset and weight applied to the object and background are expressed by the Mathematical Equation 9 below.

$$F = \Sigma(\text{weight})(\text{input} - \text{offset})$$

$$B = \Sigma(\text{weight})(\text{input}) \quad \text{Mathematical Equation 9}$$

The Mathematical Equation 9 shows that only weight is applied to input for the background (B), while the offset is subtracted from input before multiplying by weight for the object, as a pattern to be detected and searched for.

Here, the addition of the offset for the background (B) as in the Mathematical Equation 10 may increase the gap.

$$F = \Sigma(\text{weight})(\text{input} - \text{offset})$$

$$B = \Sigma(\text{weight})(\text{input} + \text{offset}) \quad \text{Mathematical Equation 10}$$

(b) is an example of a screenshot in which the object is detected from the image by applying the offset and weight.

In other words, for the object (F), a seat belt frame, the subtraction of the offset is followed by the multiplication of the weight, and for the background (B), the addition of the offset is followed by the multiplication of the weight, thereby widening the gap. Accordingly, the input image on the left is converted into the input image on the right, and the seat belt, as an object, is detected as white.

FIG. 16 illustrates an embodiment of generating rescue information using the visual cortical circuit apparatus in FIG. 9, and FIG. 17 is an example implementation of generating rescue information from an image, using the visual cortical circuit apparatus in FIG. 9.

Referring to (a) of FIG. 16, when an object is a person, the rescue information is generated by graphic-processing the shape of the object in order to protect the personal information of the passenger. In other words, visual processing may allow the position of the head and the posture and slope of the upper body to be recognized and the working of the airbag and the wearing of the seat belt to be checked.

Here, if the object is a person, only the person can be graphic-processed. In other words, the personal information of the passenger to be transmitted may be summarized into the position of the seat, the slope as the posture of the upper body, the position of the head, etc. Since the rescue center can determine the damage by the symbolized graphic alone, the personal information, which could be sensitive information, can be protected fundamentally. Also, since the amount of information transmitted to the rescue center can be minimized, the transmission speed can increase.

(b) represents a case in which the rescue information is generated in the form of a text or multimedia message (SMS/MMS). The posture and the position of the head for each passenger can be notified and the unfolding of the airbag and the wearing of the seat belt can be transmitted in the form of an integrated variable.

FIG. 17 illustrates a clear screenshot of the rescue information, wherein the detected image is converted into a black-and-white image; the background and the object are separated by applying an offset and a weight to the image; the position and slope of the object are identified; and then the information goes through graphic-processing if the object is a person.

In addition, the capability of the directional operation to imitate the visual cortical circuit can be improved through the extraction of the characteristics of the visual information.

In other words, in a region with relatively high brightness, the improvement of the result of the directional operation can improve the object recognition performance for a passenger or a subject in a limited space. For example, since the passenger is close to a window in the vehicle, he or she is located in a relatively bright area compared with other areas, regardless of whether it is day or night.

Therefore, since irrelevant areas have a relatively low luminance, the provision of directionality only for the bright area, or the application of a weight to the area, can improve the object recognition performance. In case of nighttime, as lighting, such as an infrared LED, is equipped in the vehicle and a monitoring camera for other purposes is also installed in the same way, the application of a weight to the brightness and darkness can improve the performance in the object recognition.

FIG. 18 is a flow chart for describing an object search method using a visual cortical circuit apparatus according to another embodiment of the invention.

First, as a pre-treatment process for searching for an object from an image or picture, an input image is converted into a black-and-white image (S1810).

An offset is applied to the image to distinguish the object from the background in the black-and-white image (S1820).

Using the frame of the shape of the object to be searched for, a weight is applied to a shape matching the frame on the weight-applied image or picture (S1830).

The object is singled out and detected from the image to which the offset and the weight are applied (S1840).

The order of the steps described above (S1810-1840) is only an example, and the invention is not limited thereto. In other words, the order of the steps described above is subject to change, and some of the steps can be undertaken simultaneously.

The object search method using the visual cortical circuit apparatus described in FIG. 18 may be implemented in the form of a recording medium containing instructions that can be executed by a computer, such as a program module run by a computer. The computer-readable medium may be any available medium accessible by a computer, and may contain volatile and non-volatile mediums and separable and non-separable mediums. Also, the computer-readable medium may contain a computer storage medium and a communication medium. The computer storage medium includes all volatile, non-volatile, separable and non-separable media implemented by any method or technology to store information, such as computer-readable instructions, date structures, program modules and other data. The communication medium contains typical computer-readable instructions, data structures, program modules, other data of modulated data signals, such as carrier, or other transmission mechanisms, and contains any information transmitting medium.

The explanation above of the invention is to illustrate, and one skilled in the art to which the invention pertains can understand that it is possible to easily turn the invention into another concrete form without modifying the technical spirit and essential characteristics of the invention. Therefore, the embodiments described above are, in every aspect, set forth to illustrate, but not to be construed as the limit of the present invention. For example, each component explained as a unitary type can be implemented in a distributed way, and each component explained as a distributed type can be implemented in a combined way.

The scope of the invention is defined by the appended claims, rather than the descriptions above, and the present invention should be construed as covering all modifications and variations derived from the meaning and scope of the appended claims and their equivalents.

The invention claimed is:

1. A visual cortical circuit apparatus for implementing visual cortex's response to stimuli over the period of neuron response time in a form of a voltage and outputting a voltage equivalent to the voltage, comprising:
    a transconductance unit for taking, as an input, a value with an offset applied to distinguish between a background of an image or picture and an object to be searched for;
    an externally-controlled voltage application unit for setting the offset; and
    a buffer unit for applying a weight by amplifying an input voltage or input current for a same frame as the pattern of the object.

2. The visual cortical circuit apparatus of claim 1, wherein, for the pixel values of the image or picture, the transconductance unit applies a positive offset to the background and a negative offset to the object.

3. The visual cortical circuit apparatus of claim 1, further comprising a conversion unit for converting an input image aimed at searching for an object in the image and picture into a black-and-white image, before the offset is applied to the image or picture.

4. The visual cortical circuit apparatus of claim 1, further comprising a switched capacitor unit for storing an output current from the buffer unit in the form of an electric charge.

5. The visual cortical circuit apparatus of claim 4, wherein the switched capacitor unit comprises:
    a first switch for making an output current from the buffer unit flow for a certain period of time;
    a capacitor, connected in parallel with the first switch, for storing an output current from the buffer unit in a form of an electric charge; and
    a second switch, connected in parallel with the capacitor and connected in series with the first switch.

6. The visual cortical circuit apparatus of claim 5, wherein the switched capacitor unit further comprises a third switch for discharging residual charge of the capacitor before the first switch is electrically connected.

7. The visual cortical circuit apparatus of claim 1, further comprising:
    an integrated capacitor, wherein if at least one of the visual cortical circuit apparatuses is equipped and the at least one visual cortical circuit apparatus is connected in parallel, the integrated capacitor is connected in parallel with the at least one visual cortical circuit apparatus; and
    an integrated switch for discharging residual charge of the integrated capacitor before the at least one visual cortical circuit apparatus is electrically connected.

8. The visual cortical circuit apparatus of claim 1, wherein if the pixels of the image or picture are brighter than a predetermined luminance value, the buffer unit applies the offset to the image or picture.

9. The visual cortical circuit apparatus of claim 1, further comprising:
    a search unit for singling out and detecting an object in the image with the offset or weight applied; and
    a rescue information processing unit for generating rescue information by processing an object detected by the search unit into a graphical or textual form.

10. The visual cortical circuit apparatus of claim 9, wherein if the object is a person, the rescue information processing unit processes the object into a combination of graphics representing the person's body parts.

11. The visual cortical circuit apparatus of claim 9, wherein if the object is at least one, the visual cortical circuit apparatus generates rescue information for each object.

12. The visual cortical circuit apparatus of claim 1, wherein the transconductance unit is an equivalent circuit of a differential transconductance amplifier.

13. An object search system using a visual cortical circuit apparatus, comprising:
    a conversion unit for converting an input image into a black-and-white image as a pre-treatment process to search for an object from an image or picture;
    a transconductance unit for taking, as an input, a value with an offset applied to distinguish between the background of an image or picture and an object to be searched for;
    an externally-controlled voltage application unit for setting the offset;
    a buffer unit for applying a weight by amplifying an input voltage or input current for the same frame as the pattern of the object; and
    a search unit for singling out and detecting an object from an image with the offset and the weight applied.

* * * * *